US012775726B2

(12) United States Patent
Zhang et al.

(10) Patent No.: US 12,775,726 B2
(45) Date of Patent: Oct. 27, 2026

(54) METHOD, APPARATUS AND EXTERNAL PROTECTION DEVICE FOR POWER-OFF MONITORING

(71) Applicant: BEIJING BEYONDINFO TECHNOLOGY CO., LTD., Beijing (CN)

(72) Inventors: Hao Zhang, Beijing (CN); Hua Du, Beijing (CN); Zhenhe Cai, Beijing (CN)

( * ) Notice: Subject to any disclaimer, the term of this patent is extended or adjusted under 35 U.S.C. 154(b) by 47 days.

(21) Appl. No.: 18/731,316

(22) Filed: Jun. 2, 2024

(65) Prior Publication Data

US 2024/0338469 A1 Oct. 10, 2024

Related U.S. Application Data

(63) Continuation of application No. PCT/CN2022/130165, filed on Nov. 6, 2022.

(51) Int. Cl.
*G06F 21/62* (2013.01)
*G06F 21/81* (2013.01)

(52) U.S. Cl.
CPC .............. *G06F 21/62* (2013.01); *G06F 21/81* (2013.01)

(58) Field of Classification Search
CPC ............... G06F 21/62; G06F 21/70–79; G06F 21/80–88
See application file for complete search history.

(56) References Cited

U.S. PATENT DOCUMENTS

2018/0102645 A1* 4/2018 Chong ....................... G06F 1/26
2020/0410139 A1* 12/2020 Du ........................ G06F 21/567

FOREIGN PATENT DOCUMENTS

| | | | | | |
|---|---|---|---|---|---|
| CN | 102156679 | B | * | 11/2012 | |
| CN | 107064686 | A | * | 8/2017 | G01R 31/00 |
| CN | 207571694 | U | * | 7/2018 | |
| CN | 113138938 | A | * | 7/2021 | G06F 12/0246 |
| CN | 213637191 | U | * | 7/2021 | |
| TW | 575732 | B | * | 2/2004 | |

* cited by examiner

*Primary Examiner* — Madhuri R Herzog

(57) ABSTRACT

The disclosure relates to a method and apparatus for power-off monitoring of an external protective device (EPD). The power-off monitoring apparatus monitors the abnormal power-off of an EPD, and includes a power-taking line, a power-taking switch-on module and a warning module. The power-taking line connects the power-off monitoring apparatus to a dedicated power outlet which is not connected to the power supply circuit of EPD; The power-taking switch-on module monitors abnormal EPD power off, and switches to connect with the power-taking line when abnormal power-off is detected. The warning module is used to send warning information when the power-off monitoring apparatus is launched. Through the mutually exclusive power supply design, the apparatus can switch to connect the dedicated power outlet to launch when the EPD is abnormally powered off. thu effectively preventing the safety problems caused by powering off the EPD.

8 Claims, 6 Drawing Sheets

METHOD, APPARATUS AND EXTERNAL PROTECTION DEVICE FOR POWER-OFF MONITORING

CROSS-REFERENCE TO RELATED APPLICATION

This application claims the benefit of Chinese Patent Application No. 202111479042.4, filed on Dec. 2, 2021 in the China National Intellectual Property Administration, the disclosure of which is incorporated herein by reference.

BACKGROUND OF THE INVENTION

1. Technical Field

The disclosure relates to the technical field of Security protection of the device, in particular to a power-off monitoring apparatus and a power-off monitoring method for external protective device, and corresponding external protective device.

2. Background Technology

In recent years, the development of computer and network technology has greatly promoted the popularity of the network. However, when people enjoy the convenience brought by the network, they are also facing new threats to network security and data security. Common threats include malicious code intrusion, virus/trojan infection, traffic attack, hacker theft, unauthorized access, impersonating legitimate users, destroying data integrity, interfering with the normal operation of the system, using the network to spread viruses, middleman eavesdropping, and so on.

There are many technical means to solve the problems of network security or data security, such as installing and using black/white lists in the host, using flow control software, firewalls, anti-virus intrusion detection systems and other network security products. However, even with the above measures, various security incidents still occur frequently. According to statistics, 70% of the security problems are caused by the illegal use of key resources such as hosts by internal personnel, and only 30% of the real external threats. Internal personnel lack security awareness when using the host, and they are located at the back end of the firewall. The access to various external devices is not standardized, and viruses or Trojan backdoors are implanted, resulting in data leakage, virus infection, system collapse, and even network paralysis; at the same time, the misoperation or intentional destruction of the system will also cause bad effects and heavy losses.

Moreover, for some dedicated devices, such as the host equipped with dedicated software control, and the device in some industrial engineer stations/worker stations, there is no suitable security protection software on the market, or the installation of security software is likely to cause compatibility problems in the original host software, or even affect the performance. The hosts of these engineer stations/worker stations will not upgrade the operating system after they are online, and even if security protection software is installed, the software version or malicious code base will not be updated in time, resulting in low security protection effect and efficiency.

Therefore, the prior art (WO2020087781A1) has disclosed an external terminal protective device (or called External Protective Device) and corresponding protection system to solve the above problems. The External Protective Device (EPD) takes over each interface of the protected device (PD) to ensure that the external devices that need to access the various interfaces of the protected device must be connected to the external protective device before they can be accessed, so that the purpose of protecting the protected device can be achieved without installing security protection software on the protected device However, since the EPD and the protected device are independently powered, malicious users may cut off the power supply of the EPD and make the protected device out of safety supervision, so as to achieve the purpose of destroying the protected device.

SUMMARY OF THE INVENTION

In view of this, how to monitor the abnormal power-off of EPD and still give warning in case of power failure to improve the safety of protected device is an urgent problem to be solved at present. The main purpose of the disclosure is to provide a power-off monitoring apparatus, a power-off monitoring apparatus method and corresponding EPD, so as to at least partially solve the above technical problems.

In order to achieve the above purpose, as the first aspect of the disclosure, a power-off monitoring apparatus is proposed, which is used to monitor and warn the abnormal power-off of EPD. The EPD is electrically connected to the protected device and takes over the input and output functions of the protected device to prevent illegal data transmission of the protected device, The power-off monitoring apparatus comprises a power-taking line, a power-taking switch-on module and a warning module, wherein:

- The power-taking line is used to connect the power-off monitoring apparatus to a dedicated power outlet, which is not connected to the power supply circuit of the EPD;
- The power-taking switch-on module is used to monitor whether the EPD is abnormally powered off, and to switch to connect with the power-taking line when abnormal power-off is detected, so that the power-off monitoring apparatus can be launched by taking power from the dedicated power outlet;
- The warning module is used to send warning information when the power-off monitoring apparatus is launched.

According to the preferred embodiment of the disclosure, the dedicated power outlet is provided by the power-taking line of the protected device.

According to the preferred embodiment of the disclosure, the power-taking switch-on module comprises an automatic switch, and the control end of the module is connected to the power supply circuit of the EPD; When the power supply circuit of the EPD works normally, the automatic switch disconnects the power-taking line. When the power supply circuit of the EPD is abnormally cut off, the automatic switch switches on to connect to the power-taking line.

According to the preferred embodiment of the disclosure, it also includes a storage module for storing the status information of abnormal power-off.

According to the preferred embodiment of the disclosure, the storage module is a memory shared with other modules of the EPD.

According to the preferred embodiment of the disclosure, it also includes: a communication module for transmitting the warning information to an external receiving device; and a main control module, which is used to detect whether there is an abnormal power-off state according to the working state of the power-taking switch-on module, and send instructions to the warning module according to the detection results.

According to the preferred embodiment of the disclosure, the communication module shares MAC address and IP address with the communication module of the EPD.

In order to achieve the above purpose, as the second aspect of the disclosure, a power-off monitoring method is proposed, which is used to monitor and warn the abnormal power-off of EPD. The EPD is electrically connected to the protected device and takes over the input and output functions of the protected device to prevent illegal data transmission of the protected device. The method includes the following steps:

Providing a dedicated power outlet which is not connected to the power supply circuit of the EPD;

Monitoring whether the EPD has abnormal power-off, and when abnormal power-off is detected, launching the power-taking mode on the basis of power supply from the dedicated power outlet for warning operation.

According to the preferred embodiment of the disclosure, dedicated power outlet is supplied by the power supply circuit of the protected device.

According to the preferred embodiment of the disclosure, the method also includes the step: taking power from dedicated power outlet to store the status information of abnormal power-off.

According to the preferred embodiment of the disclosure, the method also includes: taking power from the dedicated power outlet to transmit the warning information to the external receiving device.

In order to achieve the above purpose, as the third aspect of the disclosure, an external protective device is proposed, which is electrically connected to the protected device and takes over the input and output functions of the protected device to prevent illegal data transmission of the protected device. It includes the above power-off monitoring apparatus, which is used to monitor and warn the abnormal power-off of the external protective device.

According to the preferred embodiment of the disclosure, the power-off monitoring apparatus is installed inside the casing of the EPD.

According to the preferred embodiment of the disclosure, the dedicated power outlet of the power-off monitoring apparatus is provided by the USB port of the protected device.

Compared with the prior art, the disclosure has at least the following beneficial effects:

(1) Through the mutually exclusive power supply design, the disclosed power-off monitoring apparatus can be switched to connect with the dedicated power outlet to work when the EPD is abnormally powered off, thus effectively preventing the security problems caused by powering off the EPD.

(2) The power-off monitoring apparatus of the disclosure can effectively record the status information of abnormal power-off and provide data support for subsequent power-off analysis by setting up a storage module.

(3) The disclosure adopts mutually exclusive power supply between the power-off monitoring module of the EPD and other modules, so the shared storage module can be used, there is no situation where the normal operation of the memory is affected by the simultaneous operation of two channels, and the dual-port memory device does not need to be controlled by an electronic switch.

(4) Through the communication module set in the power-off monitoring apparatus, the disclosure can still transmit the warning information to the server and other external devices when the EPD is powered off, so as to achieve effective and timely monitoring.

DETAILED DESCRIPTION

Figure 1:
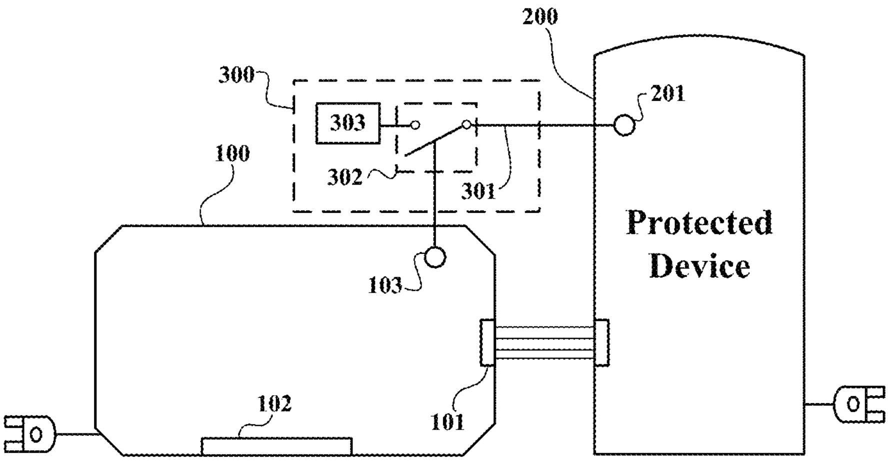
FIG. 1 is the structural diagram of the first embodiment of the power-off monitoring apparatus applied to the external terminal protection device of the disclosure.

In order to make the purpose, technical solution and advantages of the disclosure more clear, the disclosure is further described in detail below in combination with specific embodiments and with reference to the drawings.

In order to monitor the abnormal power-off of the external protective device (EPD) and still carry out the warning in the case of power off, so as to ensure the security of the protected device and prevent the protection mechanism from being bypassed by powering off the EPD, the disclosure provides a solution, that is, a power-off monitoring apparatus and corresponding a power-off monitoring method and the EPD.

It should be noted that the "abnormal power-off" in the present disclosure refers to the situation that the terminal protection device is not powered off through normal shutdown operation, such as pulling out the power plug form the power supply outlet or cutting off the power cord, or power-off by long pressing the power on/off button, or cutting off the internal lines of the terminal protection device, etc.

The power-off monitoring apparatus and method in the disclosure are specially used for monitoring and warning the abnormal power-off of EPD. The EPD is electrically connected to the protected device and takes over the input and output functions of the protected device to prevent the illegal data transmission of the protected device.

The power-off monitoring apparatus provided by the disclosure at least includes a power-taking line, a power-taking switch-on module and a warning module. The power-taking line is used to connect the power-off monitoring apparatus to a dedicated power outlet, which is not connected to the power supply circuit of the EPD; The power-taking switch-on module is used to monitor whether the EPD has abnormal power-off, and to turn on the switch to connect with the power-taking line when abnormal power-off is detected, so that the power-off monitoring apparatus can be launched by taking power from the dedicated power outlet; The warning module is used to send warning information when the power-off monitoring apparatus is launched.

The dedicated power outlet can be any possible power outlet that is not connected to the power supply circuit of the EPD. However, as a preferred method, it is connected to the power supply circuit of the protected device. Because, if the user wants to intrude into the protected device illegally, it needs the power supply of the protected device to be normal so as to read, write or transmit data, so it is a more reliable choice to connect the dedicated power outlet to the power supply circuit of the protected device.

As an implementation, the dedicated power outlet is realized as an interface/port that is used for connecting the interface/port of EPD and the EPD. In this way, on the one hand, the connection line and hardware structure can be simplified; on the other hand, when the connection line, which is connected between the EPD and the interface/port of the protected device, has the function of plugging and unplugging detection and warning, it also plays the role of protecting the connection line of the dedicated power outlet.

As another implementation, the dedicated power outlet of the power-off monitoring apparatus is provided by the USB port of the protected device. The conventional 5V USB port can be used as a power supply port. The power-off monitoring apparatus is connected to the USB port of the protected device through the power line. In addition to physical reinforcement means, by monitoring the voltage of the USB connection line, the plugging and unplugging of the USB connection line between the protected device and the power-off monitoring apparatus can also be monitored.

The power-taking switch-on module can include an automatic switch, for example, realized by a relay, which is connected to the power-taking line of the EPD; when the power-taking line of the EPD works normally, the automatic switch disconnects the power-taking line. When the power-taking line of the EPD is abnormally cut off, the automatic switch connects the power-taking line. For example, the power-taking line of the EPD is provided with a relay. When the power-taking line of the EPD supplies power normally, the relay pulls in to control the disconnection of the power-taking line of the power-off monitoring apparatus. When the power-taking line of the EPD is disconnected, the relay does not pull in to connect the power-taking line of the power-off monitoring apparatus.

For example, the automatic switch of the power-taking switch-on module detects whether the voltage difference between the power supply terminal (VCC) and the ground (GND) of the power-taking line of the EPD is lower than the preset voltage threshold to determine that the EPD is abnormally powered off.

It can be seen that the power-off monitoring apparatus of the disclosure does not supply power at the same time with other working modules of the EPD, which is also called mutually exclusive power supply or mutually exclusive working mode. That is, when other modules in the EPD are in normal power supply, the modules of the power-off monitoring apparatus is powered off; When other modules in the EPD are abnormally powered off, the power-off monitoring apparatus is triggered and launched for warning operation.

Therefore, the disclosure can make the EPD be powered from the dedicated power outlet and not stop to work when the EPD is abnormally powered off, so as to effectively prevent the safety problem by powering off the EPD.

As a preferred embodiment, the power-off monitoring apparatus includes a main control module with data processing function, which is realized by a Microprogramming controller (MCU), a single board computer (SBC) or a programmable logic controller (PLC), for example. It can detect whether there is an abnormal power-off state through the working state of the power-taking switch-on module (relay), and send instructions to the warning module according to the detection results.

As a preferred embodiment, the warning module can send out the warning information according to the detection and/or the command of the main control module. The warning mode is, for example, by sound, flash and/or screen flash, etc.

As a preferred embodiment, the power-off monitoring apparatus also includes a storage module for storing the status information of abnormal power-off. The state information can include: power-off time, abnormal power-off times, and device information. The storage module can be realized by a variety of memories, such as RAM or non-volatile memory (EPROM), preferably dual-port non-volatile memory, and further preferably Flash memory. By presetting the storage module, the disclosure can effectively record the status information of abnormal power-off and provide data support for subsequent power-off analysis.

As a preferred embodiment, the storage module is shared with other modules of the EPD. For example, the storage module can simultaneously connect the power-off monitoring apparatus and the control module of the EPD. Since the power-off monitoring apparatus and other working modules of the EPD are not powered at the same time, the storage module can write information respectively through the control of the power-off monitoring apparatus and the EPD. Since the power-off monitoring apparatus and EPD are mutually exclusive in power supply and operation, the storage module can use either single port or dual-port. There is no situation where two channels work at the same time to affect the normal operation of the memory, and electronic switches are no longer required to control the connection of different lines.

According to a preferred embodiment of the disclosure, the power-off monitoring apparatus also includes a communication module for transmitting the warning information to an external receiving device. For example, the external receiving device is a server or client of the control center, such as a rights management server, a staff client, and so on. Specifically, the power-off monitoring apparatus can transmit the warning information to the management server through the communication module. The communication module can communicate through any existing communication technology, such as wired network, wireless network, Bluetooth, etc.

According to a preferred embodiment of the disclosure, the communication module is a network communication module, which shares MAC address and IP address with the network communication module of the EPD. That is to say, the communication module of the power-off monitoring apparatus and the communication module of the EPD can further preferably adopt the shared network interface design to share the MAC address and IP address of the network interface.

The disclosure also discloses a power-off monitoring method, which is used for monitoring and warning the abnormal power-off of EPD. The EPD is electrically connected to the protected device and takes over the input and output functions of the protected device to prevent the illegal data transmission of the protected device. The method includes the following steps: providing a dedicated power outlet, which is not connected to the power supply circuit of the EPD; Monitoring to determine whether the EPD has abnormal power-off, and when abnormal power-off is detected, launching the power-taking mode of taking power from the dedicated power-taking outlet for warning operation.

As a preferred embodiment, power is taken from the dedicated power outlet to store the status information of abnormal power-off. As another preferred embodiment, power is taken from the dedicated power outlet to transmit the warning information to the external receiving device.

Preferably, when abnormal power-off is found during monitoring, the stored device-working-status information is updated or modified to indicate the status information of "abnormal power-off", and the warning information is reported. In addition, to prevent the user from cutting out the communication line maliciously to prevent reporting, it can be set to clear the status information of "abnormal power-off" until the report-success-confirmation information is received.

The disclosure also provides an external protective device (EPD), which is electrically connected to the protected device and takes over the input and output functions of the protected device to prevent illegal data transmission of the protected device. At the same time, it also includes the aforementioned power-off monitoring apparatus to monitor and warn the abnormal power-off of the EPD.

Although the power-off monitoring apparatus can work as an external device of the EPD, as a preferred embodiment, the power-off monitoring apparatus is installed inside the casing of the EPD. In other words, the power-off monitoring apparatus can work independently, but can be installed in the enclosure as an additional device of EPD, which reduces the possibility of the power-off monitoring apparatus being maliciously cut off, increases the safety protection performance, and also makes the device structure more concise.

In addition, as mentioned above, the dedicated power outlet of the power-off monitoring apparatus is realized by the USB port of the protected device. Therefore, the circuit of the power-off monitoring apparatus for connecting the dedicated power outlet can be integrated into the connection interface of the EPD and the protected device.

Exemplary embodiments of the present disclosure will be described in more detail below with reference to the accompanying drawings. Although exemplary embodiments of the disclosure are shown in the accompanying drawings, it should be understood that the disclosure can be implemented in various forms and should not be limited by the embodiments described herein. On the contrary, these embodiments are provided so that the disclosure can be more thoroughly understood and the scope of the disclosure can be completely communicated to those skilled in the art.

The term "and/or" in this article is only an association relationship that describes the association object, indicating that there can be three kinds of relationships, for example, "A and/or B" can indicate that there are three cases: A alone, A and B together, and B alone. In addition, the character "/" in this article generally indicates that the front and back associated objects are an "or" relationship.

First Embodiment

FIG. 1 is the structural diagram of the first embodiment of the power-off monitoring apparatus applied to the external terminal protection device of the disclosure. As shown in FIG. 1, the power-off monitoring apparatus 300 is used to monitor and warn the abnormal power-off of the EPD 100. The EPD 100 is connected with the corresponding interface of the protected device 200 through the internal interface 102, and one or more external devices are accessed through the external interface 101. The internal interface 102 and external interface 101 can be one or multiple. In the figure, only the connection relationship of the interface is schematically represented by blocks. The actual type and number of interfaces can vary according to specific application scenarios.

As shown in FIG. 1, the EPD 100 and the protected device 200 are powered by their power supplies respectively. The external protective device 100 is electrically connected to the protected device 100 through the internal interface. When the external device needs to be connected to the protected device, it needs to be connected to one or more of the external interfaces 101 of the EPD 100, and connected to the protected device 200 under the safety control of the EPD 100, thus taking over the input and output functions of the protected device 200 to prevent illegal data transmission of the protected device. The structure and operation method of the EPD 100 can adopt any structure or method of the prior art, which should not be limited in the disclosure.

Further, in the first embodiment, the power-off monitoring apparatus 300 includes a power-taking line 301, a power-taking switch-on module 302, and a warning module 303. The power-taking line 301 is used to connect the power-off monitoring apparatus 300 to a dedicated power outlet 201, and the dedicated power outlet 201 is connected with the power supply circuit of the protected device 200. It is worth noting that when both the EPD 100 and the protected device 200 are turned on and working normally, the power-taking line 301 is switched off and disconnected, so the warning module 303 located in the power-off monitoring apparatus 300 does not work.

The power-taking switch-on module 302 is located in the EPD 100, which is used to monitor whether the EPD 100 has an abnormal power-off, and when the abnormal power-off is detected, the power-taking line 301 is switched on, so that the power supply monitoring device 300 starts by taking power from the dedicated power outlet 201; The warning module 303 sends out warning information when the power-off monitoring apparatus 300 starts. It can be seen that the power-off monitoring apparatus 300 of this embodiment has a design of mutually exclusive power supply with other working modules of the EPD 100, and can be connected to the dedicated power outlet 201 for operation when the EPD 100 is abnormally powered off, thus effectively preventing the safety problems caused by power-off of the EPD 100.

As described above, the dedicated power outlet 201 of the first embodiment is connected to the power supply circuit in the protected device 200. However, the disclosure should not be limited to this. One of the purposes of the disclosure is to prevent the abnormal power-off of the EPD 100, which is a problem that cannot be effectively and safely controlled. Therefore, the power-off monitoring apparatus 300 of the disclosure is no longer connected to the power supply circuit of the EPD, but to a safer power-taking line. The more secure power-taking line can also be, for example, a standby power supply, a standby battery, a wireless power supply or other safe power supply device. The dedicated power outlet 201 in this embodiment is provided by the power supply circuit of the protected device 200, because it is a more reliable choice. The advantage is that if the user wants to illegally invade the protected device, it needs to be ensured that the power supply of the protected device is normal for being read, written or date transmitted.

FIG. 1 just schematically shows the dedicated power outlet 201 of the protected device 200 in the first embodiment. The dedicated power outlet 201 can be set at any power-taking point on the power supply circuit of the protected device, but it is more preferably at a power-taking point that does not substantially affect the internal circuit structure of the protected device. The dedicated power outlet can be provided by line pins directly, or can be provided by the pins of existing interfaces that can supply power, such as USB port and serial port connected to the power supply circuit.

In the first embodiment, the power power-taking switch-on module 302 includes an automatic switch connected to the power detection port 103 of the EPD 100, and the automatic switch is realized by a relay, for example. The power detection port 103 is an access point on the power supply circuit (not shown) of the EPD 100. The electrical performance (such as voltage change) of the access point should be directly related to the power-off state of the power supply of the EPD 100, but not limited to the specific access location. For example, it can be directly connected to the output end of the power supply, or to various interfaces directly associated with the power supply, such as USB port, serial port, etc.

The automatic switch of the first embodiment includes a control end and two connection ends, the control end is electrically connected to the power detection port 103, and the two connection ends are respectively connected to the dedicated power outlet 201 and the warning module 303. In addition, when the power detection port 103 has a voltage difference between the two connection ends and the voltage difference is higher than the threshold value (indicating that the power supply of the EPD 100 is normal), the automatic switch is in the switched-off state. When the power detection port 103 has the voltage difference lower than the threshold value (indicating that the power supply of the EPD 100 stops supplying power), the automatic switch automatically switches to the switched-on state. Thus, the power-taking switch-on module 302 can determine whether the EPD 100 has an abnormal power-off, and turn on the switch to connect with the power-taking line 301 when an abnormal power-off is detected, so that the warning module 303 can be powered. Therefore, the power-off monitoring apparatus 300 takes power from the dedicated power outlet 201 and launches.

In this first embodiment, the warning module 303 sends out a warning message when the power-off monitoring apparatus 300 launches, that is, when the automatic switch is automatically switched to the switched-on state, the warning module 303 sends out a warning message immediately after power is taken. The present disclosure should not be limited to the way to send warning information, including various warning information transmission modes through sound, light, electricity as the medium, such as sending out alarm sounds, flashing lights, dialing calls, sending information to specific terminals, etc. As an embodiment, the warning module 303 includes a loud speaker, LED lamp, and automatically send out alarm sound and/or flash when the power is turned on.

As another embodiment, the dedicated power outlet 201 also includes terminals/pins for information input, thus, the dedicated power outlet 201 can also receive the information sent by the power-off monitoring apparatus 300 when the power-off monitoring apparatus 300 launches. Thus, the warning module 303 can include a signal generation module for sending specific warning information to the dedicated power outlet 201 when the warning module 303 is powered, so that the protected device 200 can carry out specific warning actions after receiving the warning information, such as various warning actions carried out by the warning device of the protected device 200 itself, such as alarm sound, screen flashing, etc.

In the first embodiment, the automatic switches of the warning module 303 and the power-taking switch-on module 302 are both located outside the EPD 100. Therefore, they can be constructed as an independent device with a case. One end of the device is connected to the dedicated power outlet 201 of the protected device (such as a USB interface), and the other end is connected to the power detection port 103 of the EPD 100 (such as a USB interface). It can be seen that the embodiment adds an additional power detection module on the basis of the existing EPD, so that the existing EPD is upgraded to a device with abnormal power-off protection function.

Second Embodiment

Figure 2:
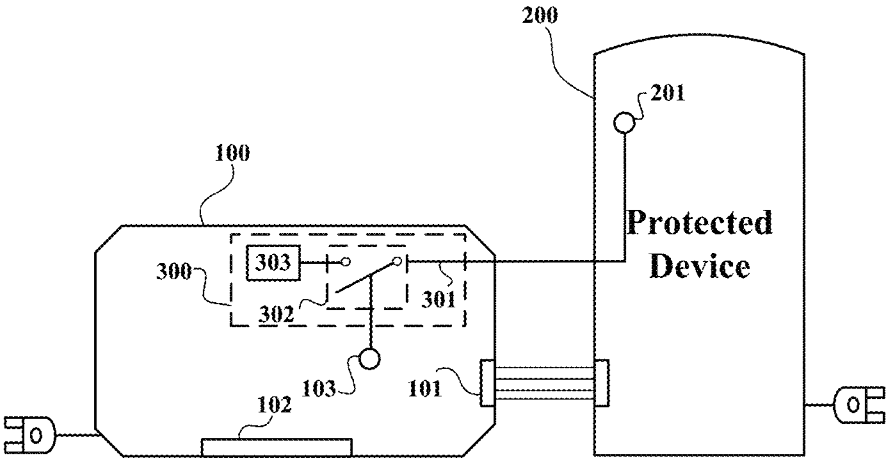
FIG. 2 is the structural diagram of the second embodiment of the power-off monitoring apparatus applied to the external terminal protection device of the disclosure.

FIG. 2 is the structural diagram of the second embodiment of the power-off monitoring apparatus applied to the EPD of the disclosure. As shown in FIG. 2, it is different from the first embodiment that the automatic switches of the warning module 303 and the power-taking switch-on module 302 of the second embodiment are located inside the EPD 100, or the second embodiment of the power-off monitoring apparatus 300 is installed inside the case of the EPD 100. The power-taking line 301 can be connected to the dedicated power outlet 201 of the protected device 200 through an interface of the EPD 100. Similarly, the dedicated power outlet 201 is connected to the power supply circuit in the protected device 200. The ports of the EPD 100 used by the power-taking line 301 can be a dedicated power port or a data port, such as serial port, USB port, etc.

In the second embodiment, the warning module 303 can be realized by using the warning device of the EPD 100 itself, such as a loudspeaker LED lights, etc.

It can be seen that in this embodiment, the power-off monitoring apparatus 100 is not implemented as an independent device, but as a module included in the power-off monitoring apparatus 100. In this way, the power-off monitoring apparatus 100 can be realized by modifying the internal hardware structure of the EPD 100, so, no additional separate devices are required, and it can makes wiring easier.

Third Embodiment

Figure 3:
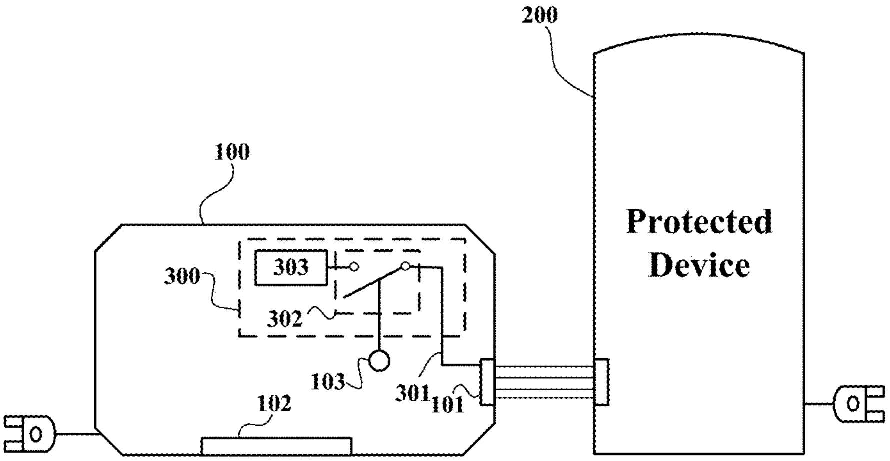
FIG. 3 is the structural diagram of the third embodiment of the power-off monitoring apparatus applied to the external terminal protection device of the disclosure.

FIG. 3 is the structural diagram of the third embodiment of the power-off monitoring apparatus applied to the EPD of the disclosure. As shown in FIG. 3, on the basis of the second embodiment, the power power-taking line 301 of the third embodiment is connected to the dedicated power outlet 201 of the protected device 200 through the internal interface 102 of the EPD 100. Similarly, the dedicated power outlet 201 is connected to the power supply circuit in the protected device 200.

The internal interface 102 of the EPD 100 is an existing interface with specific functions. The internal interface 102 is electrically connected to the protected device 100 and switched on and off under the control of the internal control module of the EPD 100, so that the external input data can be transmitted to the protected device 200 under the control of the EPD 100. The internal interface 102 is a general term for one or more interfaces, which can be USB interface, serial port, network port, etc., and is connected to the internal power supply circuit of the protected device 200. Therefore, on this basis, one of the internal interfaces 102 (such as USB interface) can be used to connected to the dedicated power outlet 201, or an additional interface dedicated to connecting to the dedicated power outlet 201 is added as one of the internal interfaces 10. Although an interface (such as USB interface) of the internal interface 102 is used as a dedicated power outlet 201, it also can be normally used as a data exchange interface when the EPD is working properly, while when the EPD is powered off, it supplies power to the power-off monitoring apparatus. From that, the sharing of interfaces can be realized.

Different from other interfaces of the internal interface 102, the internal interface used to connect to the power-taking line 301 is also connected to the automatic switch with the power-off monitoring function, the automatic switch is directly switched on and off by the power supply, while other internal interfaces are generally controlled by the dedicated interface control module.

It can be seen that, compared with the second embodiment, the third embodiment can increase the power-off monitoring function and further simplify the circuit and hardware connection structure without increasing the number of interfaces of EPD through the sharing of interfaces and circuit. In addition, when the connecting line connecting the EPD to the interface of the protected device has the function of plugging and unplugging detection and alarm, it also plays the role of protecting the connecting line of the dedicated power outlet.

Fourth Embodiment

Figure 4:
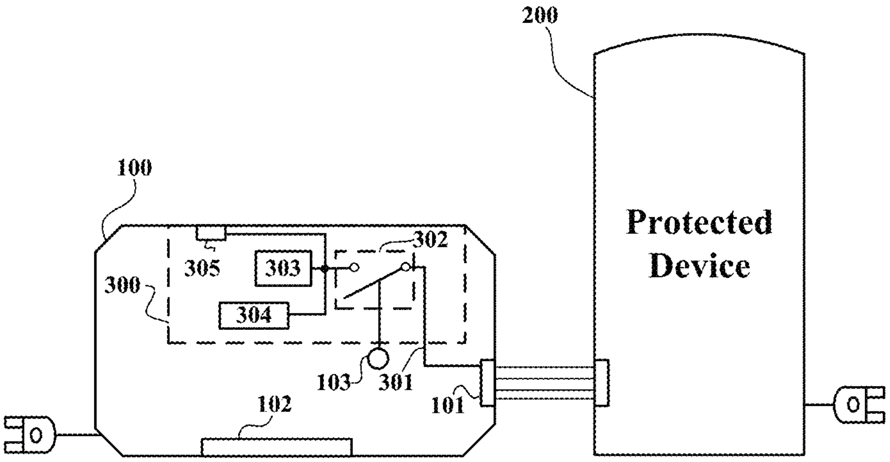
FIG. 4 is the structural diagram of the fourth embodiment of the power-off monitoring apparatus applied to the external terminal protection device of the disclosure.

FIG. 4 is the structural diagram of the fourth embodiment of the power-off monitoring apparatus applied to the EPD of the disclosure. As shown in FIG. 4, the power-off monitoring apparatus of the embodiment also includes a storage module 304 and a communication module 305. Similar to the warning module 303, they are connected to one end of the automatic switch of the power-taking switch-on module 302. Wherein, the storage module 304 is used to store the status information of abnormal power-off, and the communication module 305 is used to transmit the warning information to the external receiving device.

The storage module 304 can be realized by any memory, such as RAM, or dual-port nonvolatile memory, such as Flash, or other general storage devices. The status information of abnormal power-off refers to the information of abnormal power-off of EPD 100. As mentioned above, abnormal power-off refers to the power-off of the EPD 100 not through normal shutdown operation, such as pulling out the power supply plug from the power outlet or cutting off the power cord, or powering off by long pressing the power on/off button, or cutting off the internal lines of the terminal protection device, etc. In one embodiment, the status information of abnormal power-off is the status record of the inconsistency between the operation of the protected device 200 and the EPD 100. That is, it stores the information about the on-off state of the protected device and the working state of the EPD under two working states (the EPD is powered on or the EPD is powered off). When the power-off monitoring apparatus is launched, it indicates that the EPD 100 has an abnormal power-off event and the power is successfully taken from the protected device 200, that is, the working states of the two are inconsistent at this time. For example, a data bit "1" indicates inconsistent working status.

As a further embodiment, additional status information can be stored in the storage module, for example, the time when the working status is inconsistent can be stored in the storage module. If one or more additional sensors are added, the voltage or current changes detected by the sensor when the EPD 100 is powered off can be recorded. This can effectively record the status information of abnormal power-off and provide data support for subsequent power-off analysis. Preferably, the storage module 304 is a memory shared with other modules of the EPD 100. At this time, the memory can be a general memory accessed by both the module of the power-off monitoring apparatus 300 and the EPD 100. Since the power-off monitoring apparatus 300 and EPD 100 are mutually exclusive, when the general memory is used, there is no situation where two channels work at the same time to affect the normal operation of the memory. Preferably, a dual-port memory device can be used without the need for electronic switch control.

The communication module 305 is used to transmit the warning information to an external receiving device. The external receiving device can be any device that can receive information, such as the server located in the control center, or the client of the staff in the control center. For example, the server is a rights management server for EPD. Specifically, the power-off monitoring apparatus can transmit the warning information to the server or client through the communication module. The communication module 305 can communicate through any existing communication technology, such as wired network, wireless network, Bluetooth, etc.

As a preferred embodiment of the disclosure, the communication module 305 is a network communication module, which shares MAC address and IP address with the network communication module of the EPD 100. That is, the communication module 305 of the power-off monitoring apparatus 300 and the communication module 305 of the EPD can further preferably adopt the shared network interface design to share the MAC address and IP address of the network interface.

Fifth Embodiment

Figure 5:
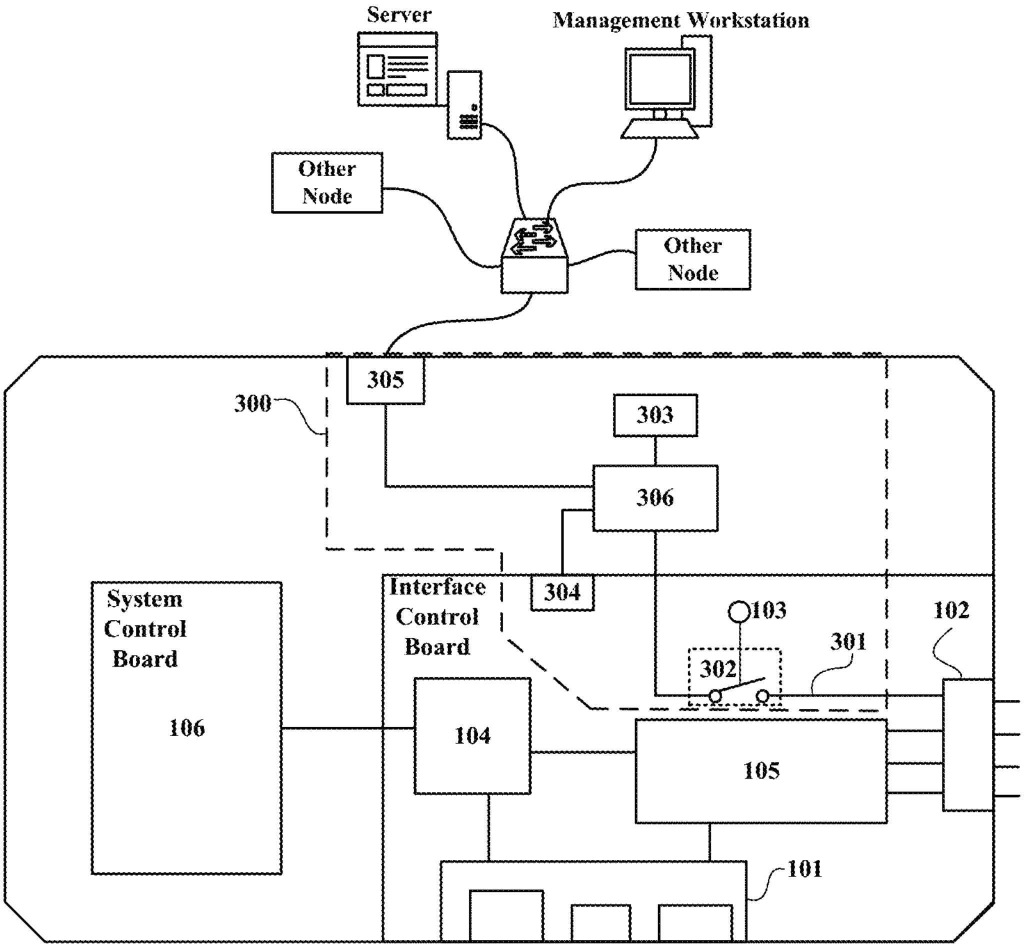
FIG. 5 is the structural diagram of the fifth embodiment of the power-off monitoring apparatus applied to the external terminal protection device of the disclosure.

FIG. 5 is the structural diagram of the fifth embodiment of the power-off monitoring apparatus applied to the EPD of the disclosure. As shown in FIG. 5, the power-off monitoring apparatus 300 of the embodiment includes a main control module 306 with data processing function, which is realized by a microcontroller unit (MCU), a single board computer (SBC), or a programmable logic controller (PLC), for example. The warning module 303, the storage module 304 and the communication module 305 are all connected to the main control module 306, so that they can be controlled by the main control module 306 to act. The main control module 306 is connected to one end of the automatic switch as the power-taking switch-on module 302. Therefore, the main control module 306 can detect whether there is an abnormal power off state through the connection state of the automatic switch, and send instructions to the warning module according to the detection result.

Further, since the main control module 306 has a data processing function, more predetermined functions can be performed through the main control module 306. For example, when the main control module 306 is powered on, it can control the alarm mode of the alarm module 303, and can also control the state information that records the storage module 304, and can also control what kind of alarm information the communication module 305 sends to where.

The embodiment also implements the specific structure of external terminal protection device. As shown in FIG. 5, the EPD 100 includes a system control board 106 and an interface control board, and the system control module 104 is electrically connected with the interface control board.

The external interface 101 and the internal interface 102 are both located on the interface control board. The system control board 104 controls the security authentication of the external devices accessed by one or more external interfaces on the interface control board. In addition, the interface control board includes an AD acquisition module 105 and an exchange chip 104, and also includes a storage module 304 shared with the power-off monitoring device of the disclosure. The AD acquisition module 105 detects the status of each interface, and the exchange chip 104 is responsible for the communication between the protected device, EPD and external device (such as remote control center). Each interface of the interface control board supports two control modes when connecting to hardware, corresponding to the two functions of USB devices, namely USB data import and export mode and USB device direct connection mode.

For the connection mode and functions of each module and component of the EPD 100, please refer to the relevant documents of prior art such as the international patent application WO2020087781A1, which will not be described here.

As a preferred implementation mode, the main control module 306 can be designed and implemented using a single chip microcomputer to support the Ethernet interface. The communication module 305 is realized by a shared network interface, and the internal design is one divided into two. One is connected to the internal interface of the EPD to achieve normal business logic, and the other is connected to the main control device 306 of the power-off monitoring apparatus 300 to report the working status of the abnormal power-off to the external device (server) through the network. Since the interface control board and the power-off monitoring apparatus are mutually exclusive, there is no situation where two channels work at the same time to affect the normal communication of the network interface of the internal interface of the interface control board.

Because the communication module adopts the same network port that is shared, in order to prevent the occurrence of different Ethernet MAC addresses may cause the switch or other security equipment to think that the abnormal situation, the power-off monitoring device supports the cloning function of the IP and MAC address of the network port, thereby ensuring the consistency of the external communication IP and MAC address of the power-off monitoring device and the EPD 100

Further preferably, in order to prevent the user from maliciously pulling out the network cable of the network interface to prevent reporting, once the interface control board finds the abnormal state of the network interface, it will update the working state of the device stored in the memory on the interface control board, and will not remove the abnormal state of the device until the report is successful. Continuing to refer to FIG. 6, in this fifth embodiment, the ports to be protected of the protected device and the EPD are connected through the connection line, the EPD connects with the server through the communication module 305 (network interface), receives the control commands and policies from the server through the network, and reports the working status and log information to the server through the network.

The Sixth Embodiment

Figure 6:
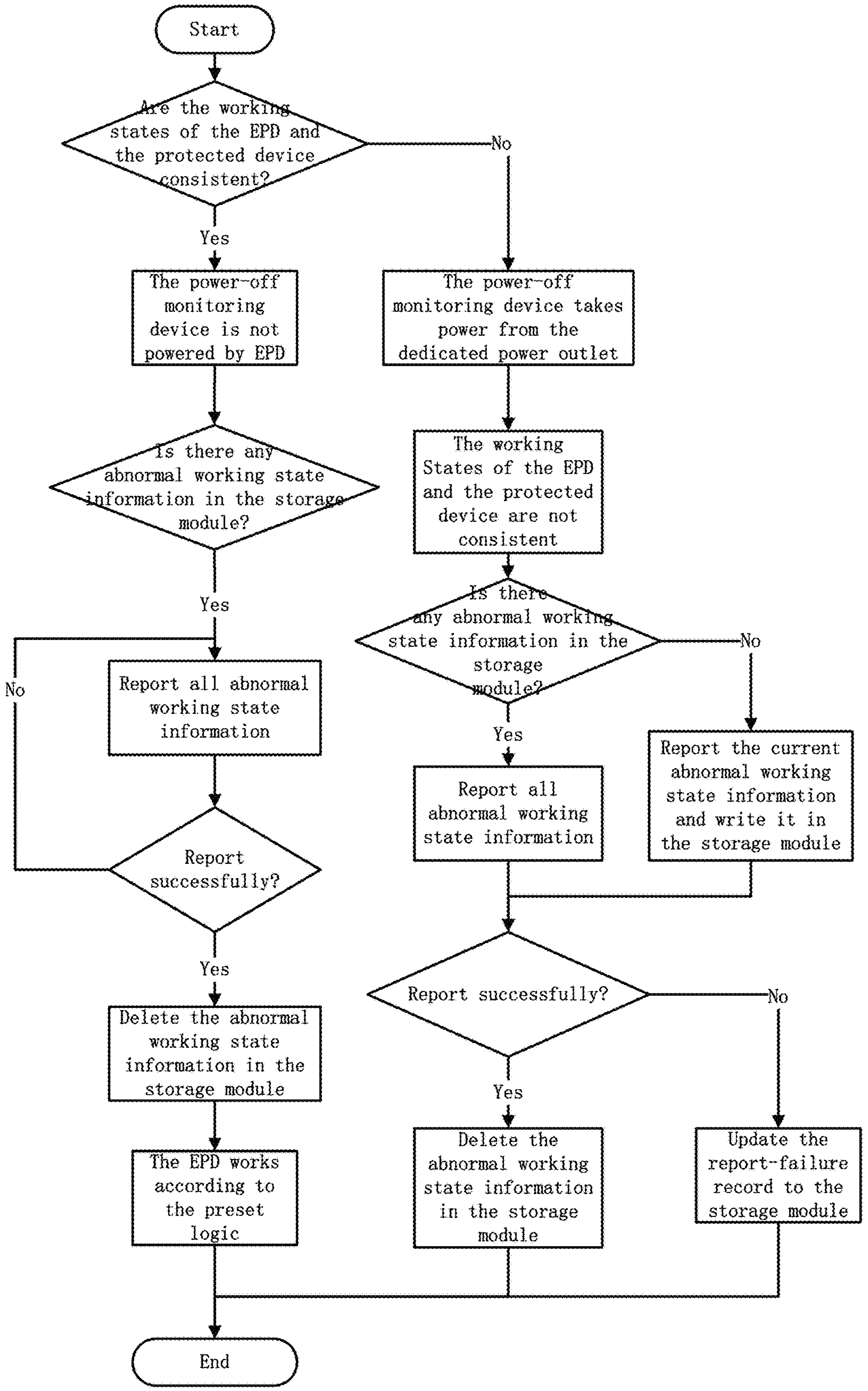
FIG. 6 is a flowchart of an embodiment of the power-off monitoring method of the present disclosure.

FIG. 6 is a flowchart of an embodiment of the power-off monitoring method of the present disclosure. This power-off monitoring method is used to monitor and warn the abnormal power-off of EPD.

As shown in FIG. 6, after the protected device is powered on, the EPD detects the interface voltage state of the protected device through the connection line between the protected device and the external protective device, and detects the power-on or power-off state of the protected device accordingly.

When the EPD 100 is also in the power-on state, the system control board 106 in EPD will disconnect the power supply of the power-off monitoring apparatus 300 through the power detection port 103 of the interface control board and the automatic switch as the power-taking switch-on module 302. The warning module 303 and the main control module 306 of the power-off monitoring apparatus 300 connected to the automatic switch will not work. The EPD 100 checks whether there is abnormal status information in the shared storage module 304, which is designed to record the information of inconsistent working state of the power-off monitoring apparatus 300 and the EPD 100. If the record information of inconsistent working status is found, the EPD 100 will report to the server through the network until the server feedback is successful, and the related functions of the EPD 100 will be disabled. After reporting, the EPD 100 will wait for the server control command and operation strategy.

When the EPD 100 is in the power-off state, it is connected to the dedicated power outlet 201 from the protected device through the power-taking line 301 and the power-taking switch-on module 302 for power supply. The warning module 303 and the main control module 306 connected to the automatic switch of the power-off monitoring apparatus 300 will be in the working state. The main control module 306 checks whether the storage module 304 has abnormal working status information (status record information with inconsistent working status). If abnormal working status information is found, the main control module 306 controls the communication module 305 to report the status information of all the protected device that are inconsistent with the working status of the EPD 100 to the server, and at the same time, the current information of inconsistent working status is recorded in the storage module 304. When the server feedback is reported successfully, the reported record will be deleted. If the report fails, the report-failure record is updated to the storage module 304.

The specific embodiments described above have further described the purpose, technical scheme and beneficial effects of the disclosure in detail. It should be understood that the disclosure is not inherently related to any specific computer, virtual device or electronic device, and various general devices can also realize the disclosure. The above is only a specific embodiment of the disclosure, and is not used to limit the disclosure. Any modification, equivalent replacement, improvement, etc. within the spirit and principle of the disclosure should be included in the protection scope of the disclosure.

The invention claimed is:

1. A power-off monitoring apparatus used to monitor and warn the abnormal power-off of an external protective device (EPD) which is electrically connected to a protected device and takes over input and output functions of the protected device to prevent illegal data transmission of the protected device, wherein:

the power-off monitoring apparatus comprises a power-taking line, a power-taking switch-on module, a main control module, and a warning module;

the power-taking line is used to connect the power-off monitoring apparatus to a dedicated power outlet, which is not connected to the power supply circuit of the EPD, and is connected to the power supply line of the protected device;

the power-taking switch-on module comprises an automatic switch, and a control end of the power-taking switch-on module is connected to the power supply line of the EPD; wherein, when the power supply line of the EPD works normally, the automatic switch disconnects the power-taking line, and when the power supply line of the EPD is abnormally cut off, the automatic switch switches on to connect to the power-taking line, so that the power-off monitoring apparatus takes power from the dedicated power outlet;

the main control module is connected to one end of the automatic switch, so as to detect whether there is an abnormal power-off state through the connection state of the automatic switch, and send instructions to the warning module according to the detection result;

the warning module is used to send warnings according to a detection state of the main control module.

2. The power-off monitoring apparatus according to claim 1, wherein the apparatus also includes a storage module for storing the status information of abnormal power-off.

3. The power-off monitoring apparatus according to claim 2, wherein the storage module is a memory shared with other modules of the EPD.

4. The power-off monitoring apparatus according to claim 1, wherein the apparatus also includes:

a communication module for transmitting the warning information to an external receiving device; and a main control module for detecting whether there is an abnormal power-off state according to the working state of the power-taking switch-on module and sending instructions to the warning module according to the detection results.

5. The power-off monitoring apparatus according to claim 4, wherein the communication module shares MAC address and IP address with the communication module of the EPD.

6. An external protective device, which is electrically connected to the protected device and takes over the input and output functions of the protected device to prevent illegal data transmission of the protected device, wherein the device includes:

the power-off monitoring apparatus according to claim 1.

7. The external protective device according to claim 6, wherein the power-off monitoring apparatus is installed inside the casing of the EPD.

8. The external protective device according to claim 6, wherein the dedicated power outlet of the power-off monitoring apparatus is provided by the USB port of the protected device.

* * * * *